US006194892B1

(12) United States Patent
Lin et al.

(10) Patent No.: US 6,194,892 B1
(45) Date of Patent: Feb. 27, 2001

(54) INTEGRATED POSITION SENSOR FOR A DISK DRIVE MICROACUATOR

(75) Inventors: Tsen-Hwang Lin, Dallas; Philip A. Congdon, Richardson; Mark W. Heaton, Irving; Michael K. Masten, Plano, all of TX (US)

(73) Assignee: Texas Instruments Incorporated

( * ) Notice: Subject to any disclaimer, the term of this patent is extended or adjusted under 35 U.S.C. 154(b) by 0 days.

(21) Appl. No.: 09/130,732

(22) Filed: Aug. 7, 1998

Related U.S. Application Data

(60) Provisional application No. 60/055,229, filed on Aug. 8, 1997.

(51) Int. Cl.$^7$ .................................................. G01B 7/14
(52) U.S. Cl. .................................. 324/207.16; 360/266.1; 360/266.4
(58) Field of Search ................ 324/207.16; 360/266.4, 360/97.01, 98.01, 245.9; 361/749, 685; 174/254

(56) References Cited

U.S. PATENT DOCUMENTS

| | | | |
|---|---|---|---|
| 5,499,161 | * 3/1996 | Hosseinzadeh et al. | 361/749 |
| 5,940,250 | * 8/1999 | McNeil et al. | 360/104 |

OTHER PUBLICATIONS

Miu et al. Jun. 1995 IEEE Transactions on Industrial Electronic vol.42 No. 3 Silicon Micromachined.*
Imamura et al. Sep. 1998 IEEE ASME vol. 3 No.3 MEMS–Based Head/Actuator/Slider.*
Hirano et al. Sep. 1998 IEEE/ASME vol. 3 No. 3 High Bandwidth for Microactuators for HDD.*
Aggarwal et al. Jun. 1997 Microactuators for HDD p. # 3979–3984 American control Conference .*

H. Guckel, et al., "Electromagnetic Linear Actuators with Inductive Position Sensing for Micro Relay, Micro Valve and Precision Positioning Applications", The $8^{th}$ International Conference on Solid State Sensors and Actuators and Eurosensors IX, Stockholm Sweden, Jun. 25–29, 1995, pp. 324–327.

H. Guckel, et al., "electromagnetic linear actuators with inductive position sensing", Sensors and Actuators A53 (1996), pp. 386–391.

Denny K. Miu, "Silicon Microstructures and Microactuators for Compact Computer Disk Drives", Silicon Microstructures and Microactuators for Compact Computer disk Drives, 1995. pp. 1–12.

Charles S. Smith, "Piezoresistance Effect in Germanium and Silicon", Physical Review, vol. 94, No. 1, Apr. 1, 1954.

J. W. Gardner, "Microsensors: principles and applications", Library of Congress Cataloging–in–Publications Data, 1994. pp. 178–183 and p. 196.

* cited by examiner

Primary Examiner—Christine K. Oda
Assistant Examiner—Subhash Zaveri
(74) Attorney, Agent, or Firm—Bret J. Petersen; Frederick J. Telecky, Jr.

(57) ABSTRACT

An improved micro-actuator position sensor which provides an accurate position signal for higher bandwidth control of a micro-actuator. The position sensor allows closed loop control of the micro-actuator position. Preferred embodiment micro-actuator sensors include a piezo-resistive stress sensor integrated within the springs, a capacitance sensor and magnetic reluctance sensor. Embodiments of the present invention are described in detail as integrated sensors for a micro-actuator used in hard disk drives. The sensor is integrated with a micro-actuator at the tip of the conventional actuator arm to improve the precision seeking capability of the actuator arm.

5 Claims, 4 Drawing Sheets

INTEGRATED POSITION SENSOR FOR A DISK DRIVE MICROACUATOR

This amendment claims priority under 35 USC 119(e)(1) of provisional application Ser. No. 60/055,229, filed Aug. 8, 1997.

FIELD OF THE INVENTION

This invention generally relates to micro-actuators such as those considered for computer system hard disk drives. More particularly, it relates to a position sensor for a micro-actuator to achieve higher bandwidth control.

BACKGROUND OF THE INVENTION

The present invention enables more precise control of a micro-actuator than in previous micro-actuator systems. For example, the present invention may be advantageously employed to position the read/write heads of a hard disk drive (HDD).

An inductive position sensor for an electromagnetic linear actuator was described in a paper by H. Guckel, T. Earles, J. Klein, D. Zook, and T. Ohnstein entitled "Electromagnetic Linear Actuators with Inductive Position Sensing" appearing in *Sensors and Actuators A* 53 (1996) at pages 386–391, incorporated herein by reference. The sensor used the self inductance of the coils for position sensing of the plunger. This system employs wire wound coils rather than an integrated coil. Also, the actuator was a solenoid plunger rather than a silicon micromachined device.

Information storage in HDD systems is arranged in concentric "tracks" upon the disks; information density increases when the concentric tracks can be placed closer together. The conventional parameter used to describe this characteristic is "tracks-per-inch" (TPI) which refers to the number of tracks measured along the radius of the disk.

There are several limitations in conventional HDD systems which prevent TPI from increasing much beyond today's state-of-the-art. The actuator arm (FIG. 1) which rotates about its pivot point determines the position of the read/write head. As TPI increases, the size of the rotation angle corresponding to a single track obviously decreases. Friction, ball slippage, and other nonlinear phenomena within the pivot and its bearings, and within flexible electrical wiring or spring mechanisms, makes control to smaller rotation angles very difficult, if not impossible. Furthermore, flexure or mechanical resonances within the actuator arm itself introduce small movements in the position of the read/write head which are essentially independent of the actuator arm's rotational movement within its bearings. Although these small movements are not serious for a low capacity HDD, they are serious limitations if one wishes to increase TPI.

In addition to limitations within the actuator arm, support bearings, and other associated structures, other disturbances also occur due to interactions between the actuator arm, read/write head, and the rotating disk. Windage effects, spindle motor eccentricities, and spindle motor cogging are examples of mechanical "run out" errors which limit practical TPI levels for today's HDD systems.

Another limitation is errors which occur when the "master" tracks are defined for the HDD. Servo write "errors" are imperfections in the concentric track locations and therefore become another limitation which the servo system must accommodate.

If a HDD is fabricated with higher bandwidth servo control, many of the limitations from friction and ball bearings can be overcome. However mechanical resonances of the arm itself not only represent small movements, but they also prevent fabrication of higher bandwidth servo control which would help overcome these other limitations.

If one attempts to increase the bandwidth beyond the limitations imposed by the mechanical resonances, the control system becomes unstable and operation is impossible. Conventional methods for reducing mechanical resonance limitations are to increase the thickness, strength, weight, and manufacturing precision of the actuator arm. Obviously this is counter to the design goals for low power, low cost HDD systems.

SUMMARY OF THE INVENTION

The present invention describes an improved micro-actuator position sensor which provides an accurate position signal for higher bandwidth control of a micro-actuator. The position sensor allows closed loop control of the micro-actuator position. Preferred embodiment micro-actuator sensors include a piezo-resistive stress sensor integrated within the springs, a capacitance sensor and magnetic reluctance sensor.

Embodiments of the present invention are described in detail as integrated sensors for a micro-actuator used in hard disk drives. The sensor is integrated with a micro-actuator at the tip of the conventional actuator arm to improve the precision seeking capability of the actuator arm. By using a combination of voice coil actuator and micro-actuator, the tracking density can be increased. The dual actuator system requires a dual feedback loop to accomplish the tracking. The in-situ position sensor according to the present invention can be used to provide the displacement information to be included in the feed back loop to the actuator control electronics. Using one or more of the above methods of sensing, the micro-actuator can be precisely driven in position so that the read/write head can be adjusted, over a small range, from track to track.

One prior art approach, described by Denny K. Miu et al in IEEE Transactions on Industrial Electronics, Vol. 42, No. 3., June 1995, incorporated herein by reference, includes a silicon micromachined rotary actuator at the end of a rotary actuator. However, this does not describe micro-actuator position sensors or the advantages that may be gained by the use of a sensor.

An advantage of the present invention is higher Bandwidth over prior art designs through closed loop control using a position sensor.

An additional advantage of the present invention is an in-situ position sensor. The position sensor can be integrally formed with the micro-actuator using compatible IC batch processes.

An additional advantage of the present invention is the position sensor in a preferred embodiment provides self aligned measurements.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIGS. 7b A representation of a magnetic sensor according to an embodiment of the present invention represented in FIG. 7a.

DETAILED DESCRIPTION OF THE PREFERRED EMBODIMENTS

The preferred embodiment of the present invention is best understood by referring to FIGS. 1–7 of the drawings, like numerals are used for like and corresponding parts of the various drawings.

Figure 1:
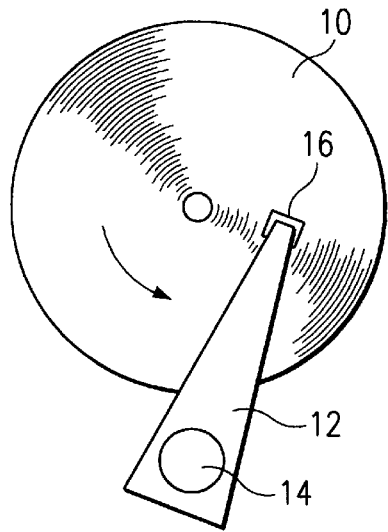
FIG. 1 A prior art hard disk drive actuator design.

With reference to FIG. 1, there is shown a simplified structure of an actuator according to the prior art. This single actuator design includes a rotating disk or platter 10, having a surface of magnetic material for storing data. An actuator arm 12 rotates about a pivot point 14 to move a read/write head 16 in an arc over the rotating disk 10. While this drawing is highly simplified, it illustrates the general concept of hard disk drives according to the prior art.

Figure 2A:
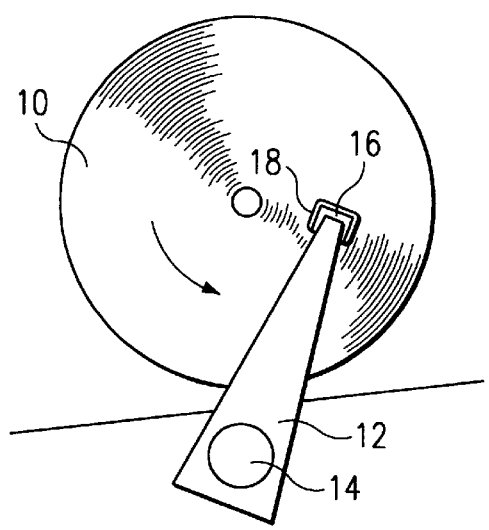
FIGS. 2a–2b A hard disk drive having a dual actuator according to an embodiment of the present invention.
Figure 2B:
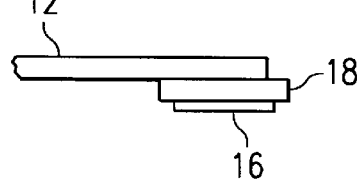

With reference to FIG. 2a, there is shown a simplified structure of an microactuator according to a co-filed, co-assigned application Ser. No. 09/131,032, TI-26126, incorporated herein by reference. As in the prior art, an actuator arm 12 rotates about a pivot point 14 to move a read/write head 16 in an arc over the rotating disk 10. In the dual-actuator design, the head 16 is placed on a micro-actuator 18 fixed to the end of the actuator arm 12. Thus, the term "dual-actuator" illustrates that there are two actuators: the conventional actuator which controls the position of the arm in the manner normally employed in HDD systems, and the micro-actuator which controls the eventual position of the read/write head as it is moved relative to the conventional arm. (For simplicity, the conventional actuator will be referred to as "actuator," and the additional actuator will be termed "microactuator".) FIG. 2b shows a side view of actuator arm 12 with the read/write head 16 attached to the micro-actuator 18.

Figure 3:
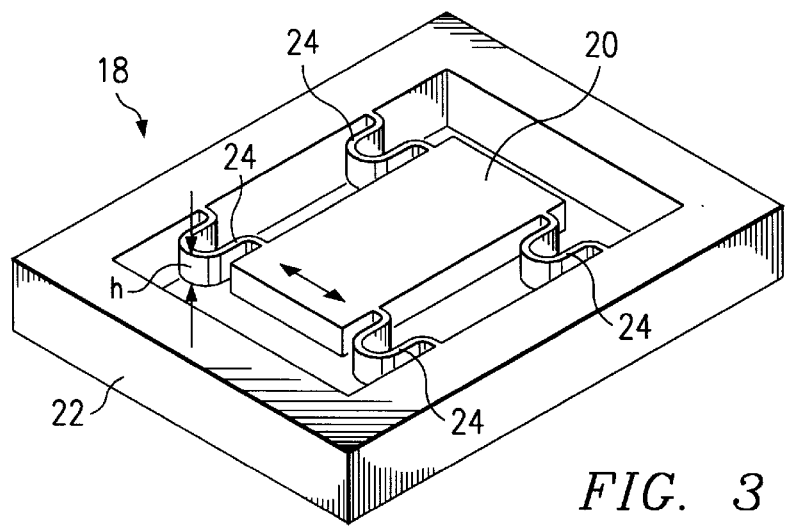
FIG. 3 A simplified micro-actuator.

With reference to FIG. 3, there is shown another representation of the micro-actuator discussed above. The micro-actuator 18 is preferably a very small silicon-based device fabricated using semiconductor IC processes. Such devices are sometimes called micro-electro-mechanical systems (MEMS). The micro-actuator 18 includes a platform 20 which can be moved relative to the remainder of the package or motor frame 22. The platform is supported by the micro-actuator's springs 24 such that when a drive motor is activated, the platform translates linearly or moves in a straight line as indicated by the arrows.

Using a micro-actuator the HDD read/write head may be moved over one or more tracks (especially for high TPI systems) without using the main (conventional) actuator. In this mode of operation, the conventional actuator is essentially dormant, and the disturbances excited by bearing friction, micro-actuator device precisely controls the position of the read/write head, in the localized area at the end of the conventional actuator arm, and the position of the head can therefore be more accurately controlled. This of course enables much higher TPI performance. When appropriate electrical drive signals are applied to a drive motor (shown in FIG. 4 as described below), the springs stretch or compress, and precision controlled deflection of the platform results. The HDD's read/write head will be attached to the movable platform, and the micro-actuator support assembly is then attached to the end of the actuator arm as described above. The micro-actuator thereby enables precise controlled movement of the head relative to the actuator arm.

Figure 4:
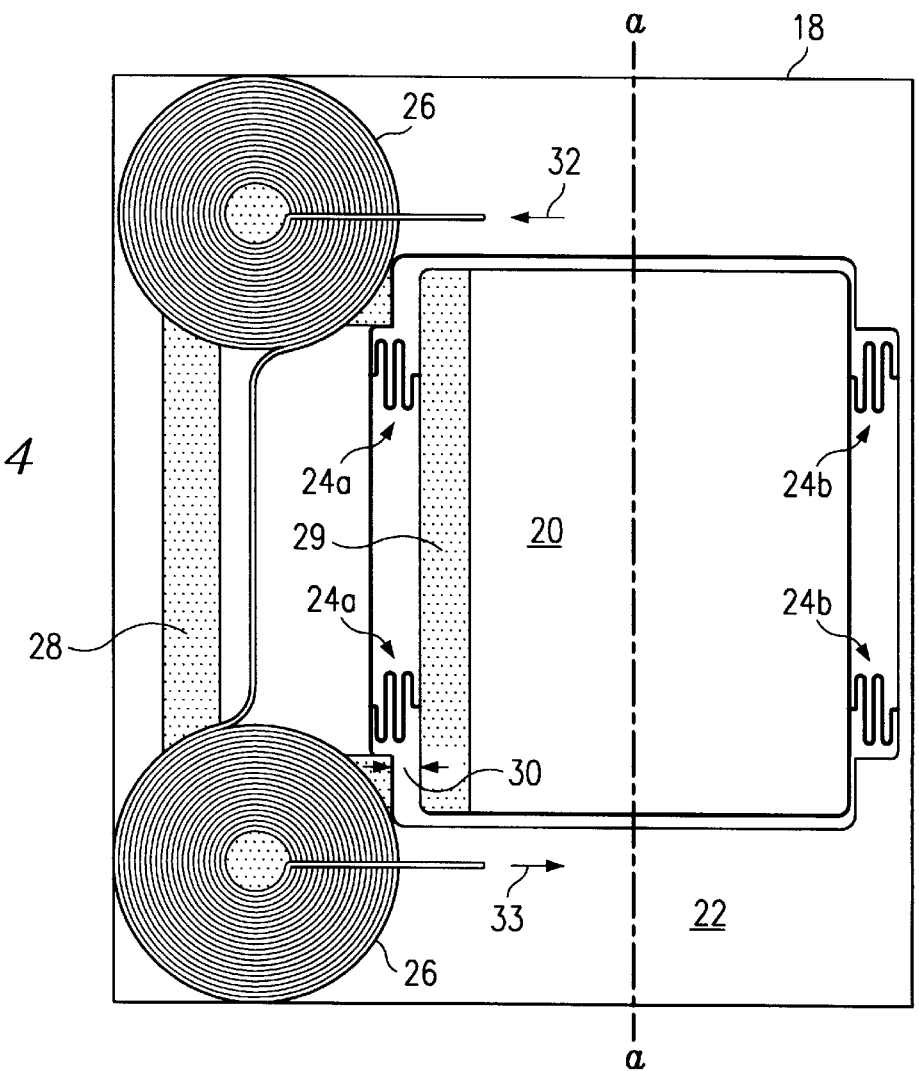
FIG. 4 A top view of a micro-actuator according to an embodiment of the present invention.

FIG. 4 illustrates a top view of the micro-actuator shown in FIG. 3 and discussed above. As above, the micro-actuator 18 includes a platform 20 which can be moved relative to the remainder of the package or motor frame 22. The platform is supported by the micro-actuator's springs 24 such that when a drive motor or other means for movement is activated, the platform translates or moves in a linear direction. In this embodiment, the drive motor is a reluctance force motor fabricated on the micro-actuator silicon. The drive motor preferably includes two pancake coils 26 on one side of the motor frame 22. A ferromagnetic material 28, 29 covers at least a portion of the platform 20 and a portion of the motor frame below and between the two coils shown as the cross-hatched areas. The ferrromagnetic material is preferably an iron-nickel permalloy plated on the silicon about 20 um thick.

The reluctance force drive motor operates to control the reluctance force gap 30. In the illustrated embodiment, the gap is at a maximum (on the motor side) when in the de-energized state. The motor must be energized to maintain the platform in the center position against the compression force of the motor side springs 24 and the tensile force of the opposing springs 24b. The motor is operated by passing current through the pancake coils. The coils are preferably in series with common terminals at 32 and 33. This unidirectional force motor achieves a smaller head which eliminates unusable space on the disk compared to a larger four coil head.

In operation, both the conventional actuator and the micro-actuator may operate simultaneously, but the micro-actuator determines the ultimate position of the read/write head. In effect, the conventional actuator determines the "relatively coarse" position (within a few tracks) and the micro-actuator determines the "fine" position (to within fractions of a track), for higher TPI systems than now possible.

Since the micro-actuator is virtually a "perfect spring", precision control is straight forward, The amount of movement of the platform is determined by the net balance of forces from the drive electronics and the spring forces from the micro-actuator structures. As a result, the deflection of the platform is a monotonic function of the drive electrical signal. This characteristic is ideal, and the same drive signal used to move the platform can also be used to drive the conventional actuator. The micro-actuator, with its high bandwidth behavior, compensates for imperfections and thereby achieves accurate tracking for high TPI systems, while the conventional actuator, with lower dynamic response, maintains the average position of the micro-actuator near the center of its dynamic range. To maximize the bandwidth of the micro-actuator, the present invention proposes an integrated sensor to allow closed loop control of the micro-actuator.

Figure 5:
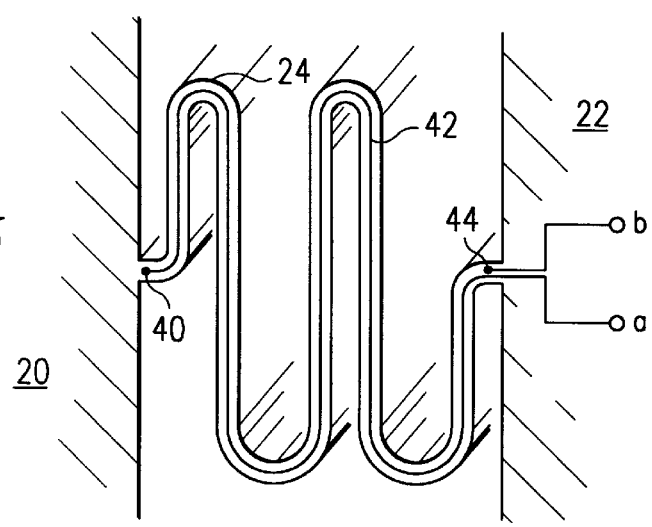
FIG. 5 A representation of a piezo-resistive sensor according to an embodiment of the present invention.

FIG. 5 represents a micro-actuator sensor according to an embodiment of the present invention. In this embodiment, a sensor is integrated into the micro-actuator springs as a piezo-resistive sensor (PRS). The PRS detects position by measuring the change in resistance of the spring material as the spring is expanded or contracted, where the resistance change is a function of mechanical stress in the material. The piezo-resistance affect has been found to exist in both n-type and p-type doped semiconductors (See *MICROSENSORS: PRINCIPLES AND APPLICATIONS*, Gardner Julian W., 1994, pp. 178–183; Smith CS, Piezoelectric effect in germanium and silicon. Phys. Rev., 1994, 42–49; both incorporated herein by reference.) FIG. 5 represents one or more of the micro-actuator springs 24 of FIG. 3 or 4. The spring 24 is located between the platform 20 and the motor frame 22. When the spring is compressed or expanded by the micro-actuator motor, the resistance of the spring material changes according to the formula:

$$\Delta R/R = Cp * \sigma$$

Where
$\Delta R$ is the change in resistance
R is the steady state resistance
Cp is the piezo-resistive coefficient for the spring material, and
$\sigma$ is the stress induced in the semiconductor spring.

In the PRS embodiment, the change in resistance may be measured with typical electrical circuits known in the prior art. These electrical circuits may be located on or off the micro-actuator. An electrical contact attached to either end of the spring may be used to isolate all or a portion of the spring to be used for the stress measurement, such that the portion of the spring between the electrical connections is monitored for changes in resistance due to mechanical stress.

Since the electrical circuit for monitoring the resistance change needs to connect to both sides of the spring (or the portion of the spring being monitored), the electrical contact point on one side of the spring 40 may extend to the opposite side of the spring by having an insulated electrical conductor 42 pass over the top of the spring and extend to node a. The second electrical contact 44 extends the opposite side of the spring to the monitoring circuit at node b. The electrical conductor may be fabricated on the top of the silicon spring using typical semiconductor processing techniques.

Figure 6A:
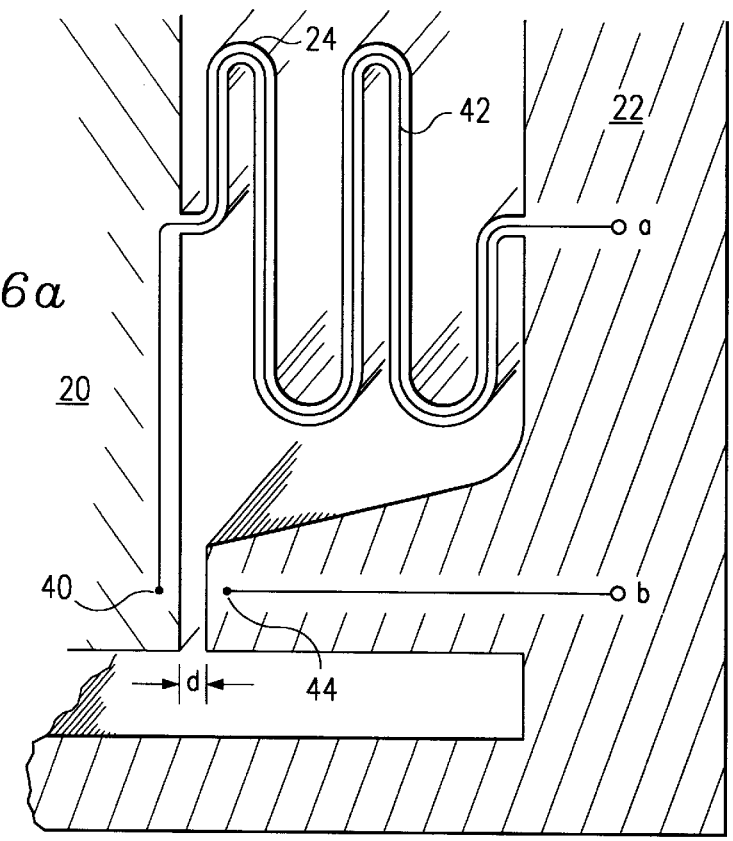
FIGS. 6a A representation of a capacitive sensor according to an embodiment of the present invention.

In other embodiments of the present invention, change in capacitance between the micro-actuator platform and motor frame is used to generate a position signal for the micro-actuator control electronics. FIG. 6a shows a capacitance sensor embodiment of the present invention where the capacitance is a function of the distance between the motor frame 22 and the platform 20. In FIG. 6a a portion of the motor platform and motor frame is illustrated. The motor frame and platform function as the opposing plates for a capacitor. The change in capacitance is measured by an electrical circuit and used as a feedback input to the micro-actuator control electronics. In this embodiment, the silicon spring may be made more insulative to enhance the capacitance change. As discussed above, an electrical contact point 40 on one side of the spring may extend the electrical node at contact point 40 to the opposite side of the spring by having an insulated electrical conductor 42 pass over the top of the spring and extend to node a.

Likewise, a second electrical contact 44 connects the motor assembly capacitor plate to the monitoring circuit at node b. The electrical conductor may be fabricated on the top of the silicon spring using typical semiconductor processing techniques. In this embodiment, the capacitance is as follows:

$$C = \epsilon_o A/(d_o + \Delta d)$$

Where
$\epsilon_o$ is the permitivity in air
A is the effective area of the capacitor
$d_o$ is the distance between the capacitor plates, and
$\Delta d$ is the change in the distance between the capacitor plates.

Figure 6B:
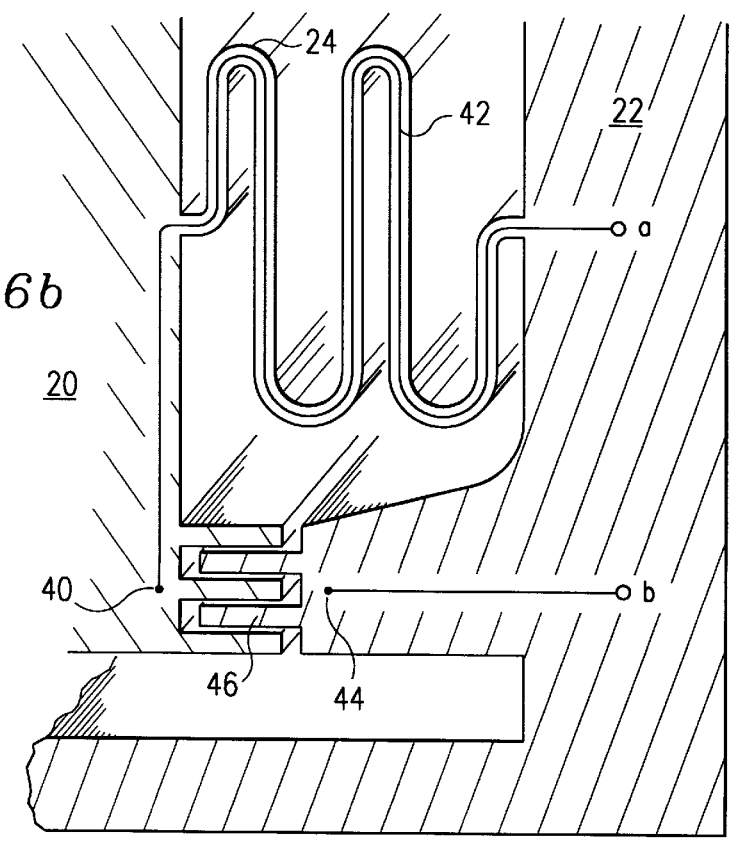
FIGS. 6b Another representation of a capacitive sensor according to an embodiment of the present invention.

FIG. 6b shows a capacitance sensor according to another embodiment of the present invention. In this embodiment, the motor frame 18 and platform 20 have fingers 46 that interleave each other. The fingers increase the effective area of the capacitor which changes with the platform movement, thereby increasing the amount of capacitance change. In this embodiment, the capacitance is as follows:

$$C = \epsilon_o (A + \Delta A)/d_o$$

Where
$\epsilon_o$ is the permitivity in air
A is the effective area of the capacitor
$d_o$ is the distance between the capacitor plates, and
$\Delta A$ is the change in the area of the capacitor plates.

Figure 7A:
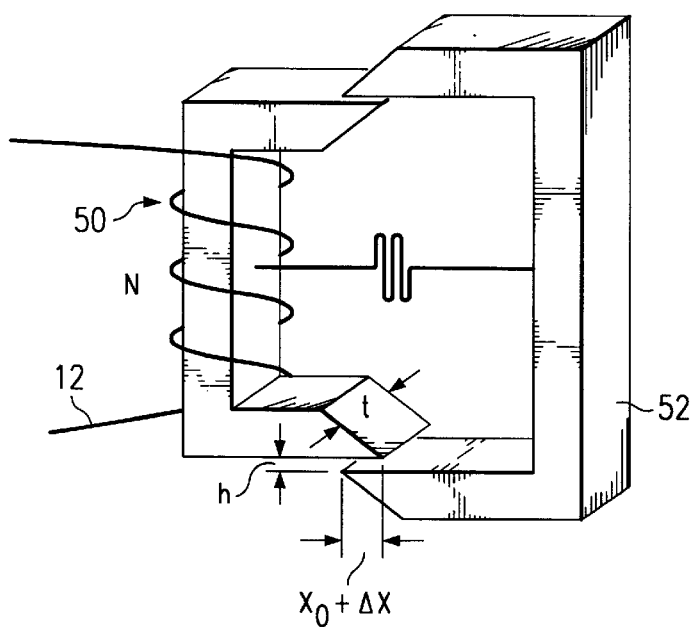
FIGS. 7a A circuit representation of a magnetic sensor according to an embodiment of the present invention.

FIG. 7a shows a magnetic circuit for an embodiment of the present invention. A second coil 50 detects movement of the platform member 52 by detecting the change in inductance. In this embodiment, the inductance is as follows:

$$L = \mu_o t(x + \Delta x) N^2 / 2h$$

Where
$v_o$ is the permitivity in air
t is the thickness of the magnetic member
$\Delta x$ is the change in the length of the overlapping area
N is the number of turns of and
h is the height between the magnetic members.

Figure 7B:
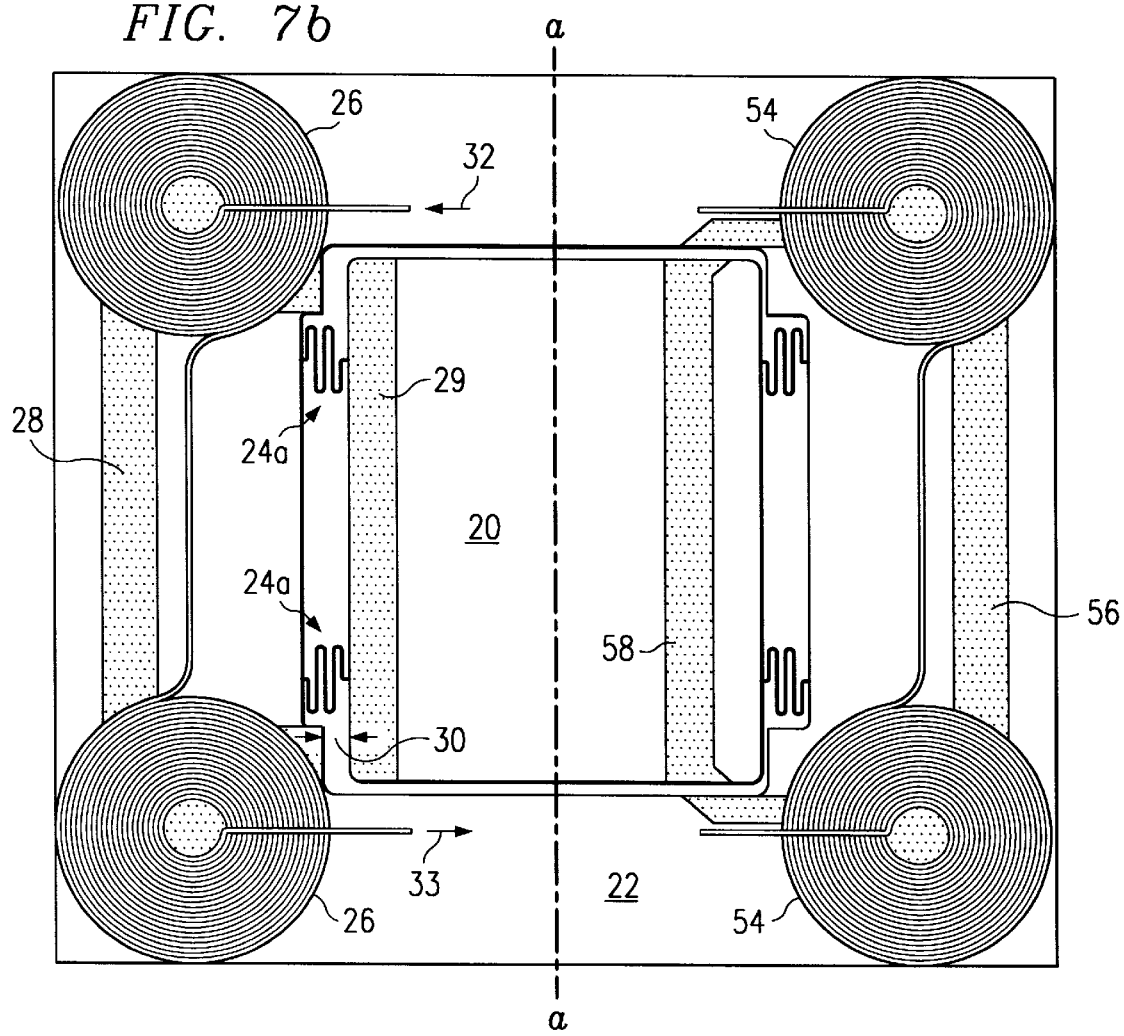

An embodiment of the present invention which implements the magnetic sensor as shown in FIG. 7b. In this embodiment, a second set of pancake coils 54 and stator 56 provide the stationary portion of the magnetic circuit represented in FIG. 7a as coil 50. The pancake coils and stator are fabricated on the motor frame 22. The stator and rotor are fabricated with ferromagnetic material as discussed above for the reluctance drive motor. The distance between the stator and rotor members is a constant distance through the travel of the platform 20. Since the distance does not change, there is no force on the platform when current is applied to the pancake coils. This configuration allows the sensor circuit to determine the position of the platform without disturbing the position or the forces of the drive motor to hold a given position.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, the illustrated embodiments are limited to translational movement micro-actuators, but the sensors of the present invention can be used for rotational or other types of micro-actuators.

What is claimed is:

1. An integrated position sensor for a micro-actuator comprising:

a. integrated means for allowing a change in physical properties in response to movement in the micro-actuator;

b. Means for detecting said change in physical properties using said integrated means to determine the micro-actuator position.

2. The integrated position sensor according to claim 1, wherein said means for allowing change in response to movement of the micro-actuator comprises micromachined semiconductor springs doped to demonstrate piezo-resistive characteristics.

3. The integrated position sensor according to claim 1, wherein said means for allowing change in physical properties in response to movement of the micro-actuator comprises providing an isolated region of the micro-actuator and the actuator assembly in close proximity which perform as capacitor plates whose relative distance of separation change with respect to the movement of the micro-actuator.

4. The integrated position sensor according to claim 1, wherein said means for allowing change in physical properties in response to movement of the micro-actuator comprises a magnetic circuit comprising a stator and coil which detects a change in inductance with respect to movement of a rotor on the micro-actuator.

5. An integrated position sensor for a micro-actuator comprising:

a. micromachined semiconductor springs separating a movable portion and a stationary portion, wherein said springs are doped to demonstrate piezo-resistive characteristics;

b. means for detecting the change in resistance of the springs to determine the relative position of the movable portion of the micro-actuator.

* * * * *